United States Patent Office 2,732,048
Patented Jan. 24, 1956

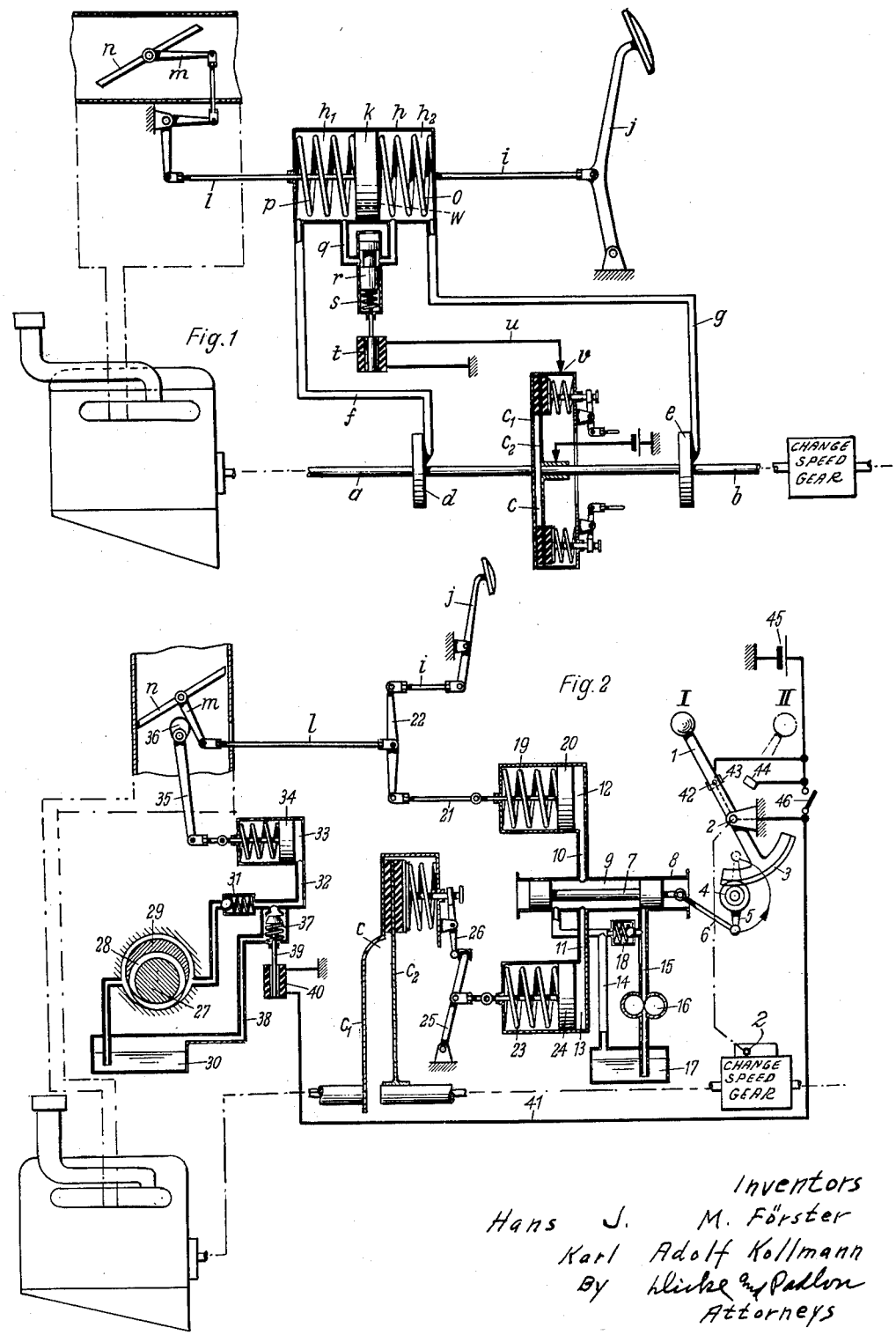

2,732,048

DRIVING DEVICE FOR INTERNAL COMBUSTION ENGINES

Hans J. M. Förster and Karl Adolf Kollmann, Stuttgart-Bad Cannstatt, Germany, assignors to Daimler-Benz Aktiengesellschaft, Stuttgart-Unterturkheim, Germany Application February 23, 1951, Serial No. 212,324

Claims priority, application Germany February 24, 1950

24 Claims. (Cl. 192—.08)

This invention relates to a driving device for internal combustion engines adapted for use in motor vehicles. It relates particularly to such a driving device in which the driven member is disconnectable from the driving member.

An important object of the invention is to synchronize the speed of driving member and driven member or primary and secondary driving member automatically thus rendering possible smooth, shock-free shifting.

Accordingly, a major feature of the invention consists therein that, dependent upon the difference in speed between driving side and driven side, the control element of the prime mover is automatically acted upon until the speed of the driving side is wholly or essentially equalized to that of the driven side. In application to change-speed gears, the gear members to be brought into mesh with each other may, by way of example, be synchronized by influencing the prime mover accordingly. Furthermore, the synchronization may be accomplished on the main clutch which, as a rule, is arranged between internal combustion engine and change-speed gear, in a manner whereby the driving half and the driven half of the main clutch are brought to and maintained at an equal speed by exerting influence upon the prime mover.

According to another feature of the invention the automatic engagement and disengagement of the main clutch, or automatic control, of the control element of the internal combustion engine takes place, in application to change-speed gears, dependent upon the position of the shift member, in such manner that during the shift from one gear to another gear the influence exerted upon clutch and engine control is cut-in upon disengagement of the hitherto engaged speed, however, again cut-out before, or as soon as, the shift member is in the new position. The interruption may, eventually, be accelerated by means of an additional, for example, electro-magnetically operated device, and may also take place positively. Most advantageously the arrangement is such a one that, independently, or in addition, to the automatic influence exerted upon the engine, the driver may still continue to influence the control element of the engine at will.

A particularly simple and advantageous force to affect the control element of the internal combustion engine, dependent upon the difference in speed of the driving members to be brought into engagement with each other, for example, the transmission members, or the members of the main clutch, may be obtained, according to another feature of the invention, by employing an auxiliary force. Particularly adapted for this purpose are hydrostatic clutches, whose parts producing the pumping effect, such as the housing, on the one hand, and piston or the like, on the other hand, deliver the greater a rate of pump delivery the greater the difference in speed of the said parts. For exerting an influence upon the engine control two pumps may be provided for, of which the one is arranged, as a primary pump, on the driving side of the drive, its rate of delivery being dependent upon the absolute driving speed and the other one of said pumps is situated, as a secondary pump, on the driven side of the drive, its rate of delivery varying with the absolute driven speed. By corresponding reciprocal action of both influences, for example, by means of double-sided seating of a piston, a corresponding control of the prime mover can be obtained. In addition, it is also possible to provide a single hydrostatic clutch between driving side and driven side, whose direction of rotation and whose rate of delivery are changed directly with the difference of speed of driving side and driven side and whose pressure of delivery is made useful, in a suitable manner, for controlling the prime mover.

These and other objects of the invention will more fully appear from the following description taken in connection with the accompanying drawings in which in each of the Figures 1 and 2 a layout of the arrangement is illustrated diagrammatically by way of example.

In the arrangement according to Fig. 1 the letter $a$ represents the driving side driven by the prime mover, and $b$ the driven side, which, for example, through a change-speed gear, drives the driving wheels of a motor vehicle. Driving side and driven side are connected with each other by a clutch $c$ having clutch halves $c_1$ and $c_2$ which may be engaged or disengaged in any suitable manner, if so desired, dependent upon shifting the change-speed gear, or at will. Situated in the driving side and driven side are speed regulators $d$ and $e$, one to each side, for example, rotary gear pumps, whose housing is rigidly secured to the engine housing and whose gears rotate with the drive shaft $a$ or driven shaft $b$. By means of lines $f$ and $g$ the rotary gear pumps $d$ and $e$ are connected with a cylinder $h$, which by means of a linkage $i$ is linked to the gas pedal $j$ operated by the driver, and is displaced together with the latter upon actuation thereof. In the cylinder $h$ slides a piston $k$, which through a linkage $l$ is connected with the lever $m$ of the throttle plate $n$. Two springs $o$ and $p$ keep the piston $k$ in an intermediate position of equilibrium. A circulation line $q$ connects the two sides $h_1$ and $h_2$ of the cylinder $h$ with each other; the circulation line $q$ is then closed or throttled by a sliding control valve $r$, if the latter is pressed upwardly by the spring $s$, or released, if the valve $r$, under the effect of an electromagnet $t$, occupies its lower position. Along with this, the electromagnet $t$ is connected with an electric circuit $u$, which is closed in a suitable manner by a switch $v$ as soon as the clutch halves $c_1$ and $c_2$ of the clutch $c$ have made contact with each other upon engagement. However, said switch $v$ is open if the clutch halves are separated from each other. The switch may, for example, be actuated hydraulically or mechanically. Any excess liquid delivered by the primary pump $d$ or secondary pump $e$ may, in each case, flow back to the suction side of the pump through a suitably adjusted throttle bore (not shown on the drawing). The pressure build up in the cylinder spaces $h_1$ and $h_2$ by the pump is, in each case, determined by the size of the corresponding throttle bore together with the speed of the pump. In place of, or eventually also in addition to, the controlled circulation line $q$, a simple, uncontrolled throttle connection $w$, for example, arranged in the piston, may be provided between the cylinder spaces $h_1$ and $h_2$ permitting a pressure balance between the cylinder spaces as soon as delivery of the pumps, serving as speed regulators, stops.

Furthermore, in place of separate pumps $d$ and $e$, a single pump, such as a differential pump, may also be employed, which operates depending directly upon the difference in speed of the shafts $a$ and $b$, or clutch halves $c_1$, $c_2$, in that, for example, the housing of the rotary gear pump revolves with the driving side and the gear of the rotary gear pump revolves with the driven side. In such a case, the suction line of the pump leads, for example, to the cylinder space $h_1$, the pressure side of the pump to the cylinder space $h_2$, and circulation of the liquid may again be by-passed through the circulation line $q$ or through an adequate throttle bore.

The mode of operation of the arrangement illustrated in Fig. 1 is as follows: If, for example, during the gear shift, the clutch is thrown out, then the switch $v$ is also opened and the slide valve $r$ is pushed into its upper end-position by the spring $s$. The circulation line $q$ is throttled or closed. Consequently, a pressure is built up in the space $h_1$ corresponding to the speed of the primary pump $d$, and in the space $h_2$ a pressure is built up corresponding to the secondary pump $e$. According as to which of both of said pressures predominates, the piston $k$ is shifted either to the right or left and operates the throttle plate $n$ independently of the position of the gas pedal $j$. If, for example, the driving side $a$ revolves at a slower speed than the driven side $b$, then the piston, owing to the greater pressure in the space $h_2$, is shifted to the left and opens the throttle $n$. The engine, in consequence, is set to greater power output and the drive shaft $a$ is accelerated until the shafts $a$ and $b$, or the clutch halves $c_1$ and $c_2$ are brought to an equal speed. If this is the case, then the piston $k$ returns to its intermediate neutral position.

If the drive shaft $a$ revolves at a greater speed than that of the driven shaft $b$, then the piston $k$ is shifted to the right and the throttle $n$ is closed. Thereby the drive shaft $a$ is retarded until synchronization is again attained.

The difference in speed, after disconnection of the clutch between driving side and driven side, is, for example, produced by throttling the engine or by synchronizing the clutch plate to the next gear or speed. The engine in its speed follows the speed of the driven side, for example, the clutch plate, irrespective of the throttle opening which has been set by the driver, so that on re-engagement there is no difference in speed between driving side and driven side. Clutch let-in is accomplished without the slightest shock and the clutch lining is protected against wear. Together with re-engagement, the circulation line $q$ is also opened and the piston $k$ is returned to its intermediate position by the springs $o$ and $p$, that is, only the foot pedal $j$ determines thereupon the opening of the throttle plate.

If the gas pedal $j$ is depressed, then the cylinder $h$ and the piston $k$, particularly with an open line $q$, move as common aggregate towards the one or the other side, without any relative displacement of cylinder and piston with respect to each other.

In the arrangement according to Fig. 2 the numeral 1 represents the gear-shift lever which can be shifted from its end position I, for one speed, to another end position II, for another speed; for engaging further speeds it may, for example, in the usual manner, be shifted in a direction perpendicular to the plane of the drawing. The lever 1 fulcrumed at 2 is rigidly secured or integral with a toothed segment 3 meshing with a pinion 4. The pinion 4 supports a crank 5 which through a connecting rod 6 displaces a sliding control valve 7. The latter is supported in a control cylinder 8 and provided with a control groove 9 which, in the position shown, is in communication, on the one hand, with the cylinder spaces 12 and 13 through the lines 10 and 11, and, on the other hand, with a return line 14. Further connected with the control cylinder 8 is a pressure line 15 which is fed by a pump 16 which delivers a steady flow of forced liquid during operation.

The pump 16 draws the liquid from a reservoir 17 and conveys it, in the position shown, through a non-return valve 18 into the return line 14, whilst access from the pressure line 15 to the control cylinder 8 is, in the position shown, blocked by the sliding control valve 7.

Supported in the cylinder 12 is a piston 20 which is under the influence of the force exerted by a spring 19 and linked by a linkage 21 to a compensating lever 22, to the other arm of which is linked the gas pedal $j$ by means of a linkage $i$, whereas the connecting joint for the rod $l$ of the throttle plate $n$ of the prime mover, which plate $n$ is actuated by the lever $m$ serves as third fulcrum point for the compensating lever 22.

In the cylinder 13 is further supported a piston 24 which is under the influence of the force exerted by a spring 23 and which through the levers 25 and 26 or the like operates the clutch $c$ of the engine which, as a rule, can also be disengaged at the will of the driver.

A hydraulic pump 27 is provided for purposes of exerting influence upon the throttle plate $n$, dependent upon the difference in speed between driving side and driven side of the clutch $c$, which pump 27, in the present case, is formed as internal toothed rotary gear pump, for example, in such a manner that the inner gear 28 with the driven side revolves together with the driven shaft, whilst the housing with the crescent 29 is connected with the drive shaft. The pump 27 draws the liquid from the reservoir 30 and forces it through the delivery valve 31 and a pressure line 32 into a cylinder 33, in which moves a piston 34 which is under the influence of the force exerted by a spring. This piston 34 acts through a linkage upon a cam 36 which may additionally displace the throttle plate $n$. Excess liquid, eventually, may flow back to the reservoir 30 through a reducing valve 37 and a return line 38. The valve 37 is further connected with the armature 39 of an electromagnet 40 which may be delivered with electric current through a cable or line 41. The conductor 41 being, for example, in connection with the fulcrum point 2 of the gear shift lever 1 connected with a contact 42 on the lever 1; the contact 42, in its turn in the position I, is in contact with a fixed contact piece 43, or in the position II with a contact 44. The contacts 43 and 44 are connected with a power source 45. Eventually, the switch 46 may connect the conductor 41 directly with the power source 45 while by-passing the gear-shift lever 1.

The mode of operation of the arrangement according to Fig. 2 is as follows: In the illustrated position of the gear-shift lever 1 (I), one of the speeds of the change-speed gear, for example, the first speed is engaged. The main clutch $c$ between engine and change-speed gear is also engaged, so that the clutch halves, or driving side and driven side, have no relative speeds as to each other. Consequently, the pump 27 does not convey any liquid and the piston 34 is in its right end-position in which it does not influence the throttle plate $n$. Electrical current flows through the electromagnet 40 and the valve 37 is open. By operating the gas pedal $j$ the driver can operate the throttle valve at pleasure, the lever 22 being swung about the connecting joint on the linkage 21.

Should it be desired to shift from position I to position II, then the lever 1 is swung in the direction of the arrow, which causes the crank 5 to perform a half revolution in opposite direction. The control valve 7 performing then a single to-and-fro motion toward the right. As soon as the lever 1 has left the position I, or the crank 5 its lower end-position, the line 14 is blocked from the control groove 9 by the left end of the control valve 7, while simultaneously the pressure line 15 is brought into communication with the groove 9. The forced liquid can flow now into the cylinders 12 and 13 and displace the pistons 20 and 24 respectively. The displacement of the piston 20 causes the closing of the throttle $n$, while the main clutch $c$ is thrown out by the action of the piston 24.

At the same time as the lever 1 is swung about its fulcrum point, the contacts 42 and 43 are released from contact and no current flows through the electromagnet 40. The valve 37 has been closed under the spring action, however, it being appropriate that a small throttle aperture remains open. Owing to the throttling of the prime mover the speed of the drive with the clutch half $c_1$ has diminished so that the pump 27 has come into action. Along with this the pressure within the space 33 is changed by an amount corresponding to the difference in speed between clutch halves $c_1$ and $c_2$ and accordingly also the position of the piston 34, or the effect of the same upon the throttle plate $n$ by means of the cam 36 is changed. The greater the pressure within the space 33, that is, the greater the difference in speed between $c_1$ and $c_2$, the more the throttle $n$ is opened. Therefore, the prime mover is accelerated, and that, so long until the clutch half $c_1$ has attained the same speed as that of the clutch half $c_2$. At this instant the pump 27 is rendered again inoperative and the influence exerted upon the throttle plate $n$ by the difference in speed of the clutch halves ceases. If the new gear is now engaged, by shifting the lever 1 definitively to the position II, the crank 5 being brought into its upper end-position, then the clutch can be smoothly let in without the slightest shock. This is accomplished by the fact that the control groove 9 is again brought into communication with the return line 14 whereby the pressure in the cylinders 12 and 13 is released and the pistons 20 and 24 are returned to their right-hand end-position. Along with this, the piston 24 releases the clutch $c$ for engagement, whilst the piston 20 sets the throttle plate $n$ for a wider opening. Simultaneously the contact 43 is brought into contact with the contact 44, whereby a circuit is closed and current flows again through the electromagnet 40. The valve 37 is opened and the cylinder 33 is instantly without pressure. Driving side and driven side are again connected with each other.

The present invention is not limited or restricted to the specific embodiment illustrated and described herein but may be varied within the scope of the several inventive concepts as defined by the appended claims.

What is claimed is:

1. A driving device comprising, a prime mover, a primary driving member driven by said prime mover, a secondary driving member driven by said primary driving member, means for connecting and disconnecting said two driving members, means for controlling said prime mover, means for actuating said control means dependent upon the difference in speed between said primary and secondary driving members, said means being adapted to accelerate the engine when the speed of said primary driving member is slower than the speed of said secondary driving member, and to retard the engine when the speed of said primary driving member is faster than the speed of said secondary driving member, and means actuated by said means for connecting and disconnecting said two driving members for placing said actuating means in action upon disconnection of said two driving members and for placing said actuating means out of action upon connection of said driving members.

2. A driving device for a motor vehicle comprising, a prime mover, a clutch having a primary driving member driven by said prime mover and a secondary driving member disconnectable from said primary driving member, means for operating said clutch, means for controlling said prime mover, means for actuating said control means dependent upon the difference in speed between said primary and secondary driving members to accelerate the engine when the speed of said primary driving member is slower than the speed of said secondary driving member, and to retard the engine when the speed of said primary driving member is faster than the speed of said secondary driving member, and means actuated by said means for operating said clutch for rendering operative said actuating means upon disconnection of said driving members and for rendering inoperative said actuating means upon connection of said driving members.

3. A driving device comprising, a prime mover, a clutch having a primary driving member driven by said prime mover and a secondary driving member disconnectable from said primary driving member, a change-speed gear in driving connection with said secondary driving member, means for controlling said prime mover, means for shifting said change-speed gear, means for actuating said control means dependent upon the difference in speed between said primary and secondary driving members to accelerate said prime mover when the speed of said primary driving member is slower than the speed of said secondary driving member, and to retard said prime mover when the speed of said primary driving member is faster than the speed of said secondary driving member, and means for rendering said actuating means inoperative with said shift means in a position corresponding to a speed of said change-speed gear and for rendering said actuating means operative with said shift means in a position between speeds.

4. A driving device comprising, a prime mover, a primary driving member driven by said prime mover, a secondary driving member, means for connecting and disconnecting said two driving members, means for controlling said prime mover, and a hydraulic pumping device having a primary and secondary pumping device, said primary pumping device being in driving connection with said primary driving member and said secondary pumping device being in driving connection with said secondary driving member in such a manner that a differential pumping effect is produced so long as a difference in speed exists between said two driving members, means for actuating said control means by means of the differential pumping effect of said pumping device to accelerate said prime mover when the speed of said primary driving member is slower than the speed of said secondary driving member, and to retard said prime mover when the speed of said primary driving member is faster than the speed of said secondary driving member, and means actuated by said means for connecting and disconnecting said two driving members for placing said actuating means in action upon disconnection of said driving members and for placing said actuating means out of action upon connection of said driving means.

5. Driving device according to claim 4, wherein said primary and said secondary pumping devices are formed as two separate pumps, and said actuating means comprises a piston member connected with said control device, said piston member being influenced on the one side through said primary pumping device and on the other side through said secondary pumping device.

6. Driving device according to claim 4, wherein said primary and secondary pumping devices form relatively movable parts of a single pump.

7. Driving device according to claim 1 in combination with a control member to be operated purposely and means for further operating said control means by said control member.

8. Driving device according to claim 1 in combination with means to be operated purposely for rendering said actuating means inoperative.

9. Driving device according to claim 4, wherein said actuating means comprises, a cylinder, a piston therein, means for conducting the pressure built up by said primary pumping device to one side of said piston, means for conducting the pressure built up by said secondary pumping device to the other side of said piston, spring means for keeping said said piston in an intermediate position, and a throttle connection interconnecting the two spaces formed in said cylinder on the two sides of said piston.

10. Driving device according to claim 4, wherein said actuating means comprises, a cylinder, a piston therein, means for conducting the pressure built up by said primary pumping device to one side of said piston, means for conducting the pressure built up by said secondary pumping device to the other side of said piston, spring-loaded means for keeping said piston in an intermediate position, a circulation line connecting both sides of said piston, means for blocking and releasing said circulation line dependent upon said connecting and disconnecting means adapted to block said circulation line when both of said driving members are disconnected and to release said circulation line when said driving members are connected.

11. Driving device according to claim 4, wherein said primary and secondary pumping devices from relatively movable members of a single pump, and wherein said actuating means comprise, a piston member exerting influence upon said control means, means for conducting the pressure built up by said pump to said piston and a valve arrangement in said conducting means for cutting out the influence upon said piston exerted by the pressure by opening said valve arrangement.

12. Driving device according to claim 4 in combination with a control member operable at will and a linkage connecting said control member with said control means, wherein said actuating means comprises, a cylinder and piston, one of these being connected with said control member which is operable at will and the other one being connected with said control means, and means for conducting the pressure built up by said primary pumping device to one side of said piston and the pressure built up by said secondary pumping device to the other side of said piston.

13. Driving device according to claim 1, wherein said actuating means comprises a stop member which affects said control means and serves at the same time as stop member for idling the engine.

14. A driving device comprising, a prime mover, a primary driving member driven by said prime mover, a secondary driving member which can be driven by said primary driving member, means for connecting and disconnecting said two driving members, a throttle member in the intake of said prime mover, an operating member operable at will for displacing said throttle member, additional means for displacing said throttle member dependent upon the difference in speed between said primary and secondary driving members to accelerate said prime mover when the speed of said primary driving member is slower than the speed of said secondary driving member and to retard said prime mover when the speed of said primary driving member is faster than the speed of said secondary driving member, and means actuated by said means for connecting and disconnecting said driving members for rendering said additional means operative upon disconnection of said driving members and for rendering said actuating means inoperative upon connection of said driving members.

15. Driving device according to claim 14, wherein said additional means comprises, a pumping device producing a pumping effect dependent upon the difference in speed between said two driving members, a further pressure source, means for influencing said throttle member by said pressure source for moving said throttle in the sense of closing, and means for exerting independently of said influencing means the pumping effect of said pumping device upon said throttle member to move said throttle member in the sense of opening upon increase of the pumping effect.

16. Driving device according to claim 14 in combination with a change-speed gear, shift means for shifting said change-speed gear and rendering said additional means inoperative when said shift means engages a speed of said change-speed gear, and for rendering operative said additional means with said shift means in a position between speeds.

17. A driving device comprising a prime mover, a primary driving member driven by said prime mover, a secondary driving member, means for connecting and disconnecting said two driving members, means for controlling said prime mover, and a hydraulic pumping device with a primary and secondary pumping device, said primary pumping device being in driving connecton with said primary driving member and said secondary pumping device being in driving connection with said secondary driving member in such a manner that a differential pumping effect is produced so long as a difference in speed exists between said two driving members, means for actuating said control device by means of the differential pumping effect of said pumping device to accelerate said prime mover when the speed of said primary driving member is slower than the speed of said secondary driving member, and to retard said prime mover when the speed of said primary driving member is faster than the speed of said secondary driving member, the primary and the secondary pump devices forming relatively moving parts of a single pump.

18. A driving device comprising a prime mover, a primary driving member driven by said prime mover, a secondary driving member, means for connecting and disconnecting said two driving members, means for controlling said prime mover, and a hydraulic pumping device with a primary and secondary pumping device, primary pumping device being in driving connection with said primary driving member and said secondary pumping device being in driving connection with said secondary driving member in such a manner that a differential pumping effect is produced so long as a difference in speed exists between said two driving members, means for actuating said control device by means of the differential pumping effect of said pumping device to accelerate said prime mover when the speed of said primary driving member is slower than the speed of said secondary driving member, and to retard said prime mover when the speed of said primary driving member is faster than the speed of said secondary driving member, wherein said primary and secondary pumping devices form relatively movable members of a single pump, and wherein said actuating means comprises a piston member exerting influence upon said control means, means for conducting the pressure built up by said pump to said piston member, and a valve arrangement in said conducting means for cutting out the influence upon said piston exerted by the pressure by opening said valve arrangement.

19. A driving device comprising a prime mover, a primary driving member driven by said prime mover, a secondary driving member, means for connecting and disconnecting said two driving members, means for controlling said prime mover, and a hydraulic pumping device with a primary and secondary pumping device, said primary pumping device being in driving connection with said primary driving member and said secondary pumping device being in driving connection with said secondary driving member in such a manner that a differential pumping effect is produced so long as a difference in speed exists between said two driving members, means for actuating said control device by means of the differential pumping effect of said pumping device to accelerate said prime mover when the speed of said primary driving member is slower than the speed of said secondary driving member, and to retard said prime mover when the speed of said primary driving member is faster than the speed of said secondary driving member, in combination with a control member operable at will, and a linkage connecting said control member with said control means, wherein said actuating means comprises a cylinder and piston, one of said cylinder and piston being connected with said control member which is operable at will and the other one being connected with said control means, and means for conducting the pressure built up by said primary pumping device to one side of said piston and the pressure built up by said secondary pumping device to the other side of said piston.

20. A driving device comprising a prime mover, a primary driving member driven by said prime mover, a secondary driving member which can be driven by said primary driving member, means for connecting and disconnecting said two driving members, a throttle member in the intake of said prime mover, an operating member operable at will for displacing said throttle member, additional means for displacing said throttle member dependent upon the difference in speed between said primary and secondary driving members to accelerate said prime mover when the speed of said primary driving member is slower than the speed of said secondary driving member and to retard said prime mover when the speed of said primary driving member is faster than the speed of said secondary driving member, wherein said additional means comprises a pumping device producing a pumping effect dependent upon the difference in speed between said two driving members, a further pressure source, means for influencing said throttle member by means of said pressure source for moving said throttle in the sense of closing, and means independent of said influencing means for exerting the pumping effect of said pumping device upon said throttle member to move said throttle member in the sense of opening upon increase of the pumping effect.

21. A driving device according to claim 20 in combination with means for imparting the effect of said further pressure source to said means for connecting and disconnecting said driving members.

22. A driving device comprising a prime mover, a primary driving member driven by said prime mover, a secondary driving member which can be driven by said primary driving member, means for connecting and disconnecting said two driving members, a throttle member in the intake of said prime mover, an operating member operable at will for displacing said throttle member, additional means for displacing said throttle member dependent upon the difference in speed between said primary and secondary driving members to accelerate said prime mover when the speed of said primary driving member is slower than the speed of said secondary driving member and to retard said prime mover when the speed of said primary driving member is faster than the speed of said secondary driving member and means actuated by said means for connecting and disconnecting said driving members for placing said additional means in action when the two driving members are disconnected and to place said additional means out of action when said driving members are connected, wherein said additional means comprises a pumping device producing a pumping effect dependent upon the difference in speed between said two driving members, a further pressure source, means for influencing said throttle member by means of said pressure source for moving said throttle member in the sense of closing, and means for exerting the pumping effect of said pumping device upon said throttle member to move said throttle member in the sense of opening upon increase of the pumping effect in combination with means for operatively connecting said further pressure source to the means for connecting and disconnecting said driving members.

23. A driving device having a change gear comprising a driving machine, a primary driving member driven by said driving machine, a secondary driving member, means for coupling and uncoupling said two driving members, means for regulating said driving machine, an actuating member for adjusting said regulating means, means for additionally displacing said regulating means depending on the difference in speed between said primary and secondary driving member, said last-named means accelerating said driving machine when the speed of said primary driving member is lower than the speed of said secondary driving member and retarding said driving machine when the speed of said primary driving member is greater than the speed of said secondary driving member, control means for changing said change gear and for coupling and uncoupling said two driving members, said control means being operative to inactivate said actuating means with said control means in a position corresponding to a speed of said change gear, and to render said actuating means active with said control means in a position between speeds of said change gear, a pressure means, a source for said pressure means, a control slide for said pressure means, a connection between said control means and said control slide to control said slide to move during movement of said control means from one end position thereof into the other and back again, a cylinder, a spring-loaded piston movable in said cylinder, a pressure line from said control slide to said cylinder, a connecting rod system between said piston and said means for regulating said driving machine, a further cylinder, a further spring-loaded piston moving in said further cylinder, a pressure line connected to said further cylinder, and a rod system between said further piston and said means for coupling said two driving members, the pressure source and the two lines being so-connected to said control slide to enable said pressure means to act on said two pistons for a time and to enable said pistons to actuate said means for regulating said driving machine and for uncoupling and coupling said two driving members during motion of said control slide between said two end positions.

24. A driving means according to claim 23 in which said means for regulating the driving machine consist of a throttle member in the inlet line of the driving machine.

References Cited in the file of this patent

UNITED STATES PATENTS

| | | |
|---|---|---|
| Re. 20,824 | Maybach | Aug. 9, 1938 |
| 1,624,008 | Ricker | Apr. 12, 1927 |
| 1,702,721 | Charles | Feb. 19, 1929 |
| 1,706,739 | Moran | Mar. 26, 1929 |
| 1,997,575 | Cummins | Apr. 16, 1935 |
| 2,089,590 | Walti | Aug. 10, 1937 |
| 2,203,296 | Fleischel | June 4, 1940 |

FOREIGN PATENTS

| | | |
|---|---|---|
| 864,033 | France | Apr. 16, 1941 |